(12) United States Patent
Mooneyham (10) Patent No.: US 8,896,708 B2
(45) Date of Patent: Nov. 25, 2014

(54) SYSTEMS AND METHODS FOR DETERMINING, STORING, AND USING METADATA FOR VIDEO MEDIA CONTENT

(75) Inventor: Mark Randall Mooneyham, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1449 days.

(21) Appl. No.: 12/263,118

(22) Filed: Oct. 31, 2008

(65) Prior Publication Data

US 2014/0247392 A1 Sep. 4, 2014

(51) Int. Cl.
*H04N 5/225* (2006.01)
*G06F 13/00* (2006.01)

(52) U.S. Cl.
USPC .......................................... 348/207.1; 725/46

(58) Field of Classification Search
USPC ....................... 386/95, 126, 326, 331; 725/46; 348/207.1
See application file for complete search history.

(56) References Cited

U.S. PATENT DOCUMENTS

| | | | |
|---|---|---|---|
| 6,459,388 B1 * | 10/2002 | Baron | 340/996 |
| 2002/0146232 A1 * | 10/2002 | Harradine et al. | 386/46 |
| 2003/0167173 A1 * | 9/2003 | Levy et al. | 704/273 |
| 2004/0174434 A1 * | 9/2004 | Walker et al. | 348/211.3 |
| 2005/0033760 A1 * | 2/2005 | Fuller et al. | 707/100 |
| 2006/0098941 A1 * | 5/2006 | Abe et al. | 386/52 |
| 2006/0244845 A1 | 11/2006 | Craig et al. | |
| 2008/0165081 A1 * | 7/2008 | Lawther et al. | 345/1.2 |
| 2009/0290854 A1 * | 11/2009 | Smith et al. | 386/96 |

FOREIGN PATENT DOCUMENTS

WO WO 2007110822 A1 * 10/2007 ............. G11B 27/10

OTHER PUBLICATIONS

"Extensible Metadata Platform," http://en.wikipedia.org/wiki/Extensible_Metadata_Platform, downloaded from the Internet on Apr. 4, 2008.
"How Clearplay Works," http://www.clearplay.com/Movies/HowClearPlayWorks.aspx, downloaded from the Internet on Aug. 21, 2008.
"ClearPlay—Parental Control," http://www.clearplay.com/About.aspx, downloaded From the Internet on Aug. 21, 2008.
"Motion Picture Association of America," http://www.mpaa.org/filmratings.asp downloaded from the Internet on Jun. 5, 2008.
"V-Chip—Wikipedia, the free encyclopedia," http://en.wikipedia.org/wiki/V_chip, downloaded from the Internet on Jul. 23, 2008.

* cited by examiner

*Primary Examiner* — Mekonnen Dagnew
(74) *Attorney, Agent, or Firm* — Kilpatrick Townsend & Stockton LLP (57) ABSTRACT

Certain embodiments provide methods and systems that link a video recording device and a processing device to enhance video media content development workflow and enable a variety of features. For example, a video camera may send all or a portion of a recorded video to a separate computer that can determine information to be associated with the recorded video. In some embodiments, the computer extracts information from the recorded video to be embedded or otherwise associated with the recorded video as metadata. In some cases, the computer retrieves information from other sources such as Internet websites for association with the recorded video. In some embodiments, the computer sends the information back to the camera where it is associated with the recorded video stored at the camera. In some embodiments, the computer provides the recorded video and information to other locations and parties, for example, to a director remotely overseeing filming.

23 Claims, 5 Drawing Sheets

SYSTEMS AND METHODS FOR DETERMINING, STORING, AND USING METADATA FOR VIDEO MEDIA CONTENT

FIELD OF THE INVENTION

Embodiments of the present disclosure relate generally to capturing, communicating, storing, and/or using recorded video media content and metadata.

BACKGROUND

Video and other rich media are often opaque in the sense that the media's content, source, and other properties are difficult to identify from the finished media product. Such information is often only available if someone has taken the time to examine the media's content and manually associated metadata describing the content with the media. Moreover, information associated after the media's creation may be inaccurate and is likely to lack information not available from an after-the-fact inspection of the media, such as information known only at the time of the media's development. Generally, the earlier information tracking begins in the media development process, the more likely useful information will be captured and included in the media's metadata. Metadata creation often does not occur until the end of or after the media development process, if at all.

Various specific problems are associated in the context of creating metadata for video content. The typical video production process does not facilitate the creation and association of metadata with recorded content. While the processing power of video cameras continues to increase, such cameras are typically not as powerful as general purpose computers, and thus generally do not have the in-camera ability to analyze recorded content for metadata. Accordingly, film clips created by a video camera in a typical production process are not processed for relevant metadata until well after filming, if at all. If the media content is provided for processing, a computer can extract information for inclusion as metadata, as examples, by analyzing the audio and/or video tracks, doing speech to text analysis, scene analysis, logo recognition, and/or other types of analysis. Generally, even if information for metadata is extracted, the information is not available in a timely manner for use in the video development process, such as, for example, to help select among shots, locate clips, provide information on location, etc.

SUMMARY

Certain embodiments described herein provide methods and systems for creating and using video media content and metadata. Certain other embodiments provide a video recording device such as a camera for sending raw media information to a processor such as a laptop computer. The processing device extracts or otherwise develops information for inclusion in the video media's metadata and stores the information or sends it back to the video recording device. One exemplary method comprises capturing video media content using a video recording component and sending data from the captured video media content at the video recording component to one or more processing components. This exemplary method further comprises, at the video recording component, receiving information determined using the data from the captured video media content and associating the captured video media content with that information. In this exemplary method, associating the captured video media content with the information may comprise, for example, embedding the information as embedded metadata in a file comprising the captured video media content. This file may be stored at the video recording component.

An exemplary system comprises a video recording component, a connection component, a processing component, and an association component. The video recording component captures video media content and the connection component, which may be a part of or attached to the video recording component, sends data from the captured video media content to one or more processing components. A processing component receives the data from the captured video media content and uses it to determine information for association with the captured video media content. The association component associates the captured video media content with the information, for example, by embedding the information as embedded metadata in a file comprising the captured video media content.

In other embodiments, a computer-readable medium (such as, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Certain embodiments described herein provide methods and systems that provide a dynamic data link or other connection between a video recording device and a processing device to enhance workflow and enable a variety of features. For example, certain embodiments send all or some of a recorded video from a video recording device to a computer for metadata extraction. As a particular example, a Wi-Fi or other wireless data exchange may be created between a video recording device and a laptop computer and used to transmit raw media information from the video recording device to the laptop computer. The laptop computer may then process the raw data, for example, through extracting metadata and/or deriving metadata by looking up information relevant to the raw data. The laptop computer may return the extracted and derived metadata to the video recording device for association with the recorded video at the video recording device.

Certain embodiments involve sending raw media information from a video recording device to a processing device and returning metadata back to the video recording device. The processing device may derive, identify, or create various types of metadata, including but not limited to camera metadata, content metadata, and environment metadata. Camera metadata includes camera parameters such as iris, focus, zoom, gamma, white balance and other settings. Such metadata may be extracted from the raw media content that is received.

Environment metadata includes all available environmental data such as GPS coordinates, heading, precise time, weather (e.g., cloudy), etc. In certain embodiments, the processing device retrieves information from an external source, such as the Internet. For example, a processing device may retrieve weather information from a weather website about the weather on the day/time of shooting and include such information in the metadata for the captured video. The processing device may also retrieve map information from an online map service. One exemplary use involves using global positioning system ("GPS") information to synchronize multiple cameras. Such GPS information may provide very precise time (e.g., readable 1/60 second) allowing video recording devices shooting the same event to be precisely synchronized, for example, down to the frame.

Content metadata includes, but is not limited to, scene, shot and take numbers, description, characters that are visible, good/no good, production notes, etc. The processing device may run a speech-to-text routine on an audio portion of the raw media content that is received to determine transcript text for inclusion in the metadata. Real-time, or near real-time, speech-to-text transcriptions, script synchronizations, logo recognition, face recognition, shot-by-shot data, and other metadata information can provide various benefits. For example, face recognition may be used to identify which characters are appearing in a particular movie scene. The raw data may also be examined to determine other attributes of the shot, such as whether the shot is a close-up, wide shot, pan, zoom, or involve another type of shot motion.

With respect to speech-to-text, the results may be combined with or created using a shooting script for a video recording. The script can be used to automatically resolve ambiguities in the speech-to-text results. The speech-to-text information can also be used for recognizing a particular scene. Thus, in some cases a video can be automatically associated via metadata with scene and shot identifiers without the need for manual identification of the video scene and shot. The scene can be automatically "logged." Scene recognition may also be based on scene recognition technology, including, for example, technology that can determine that a given video is showing an ocean scene or a forest scene, etc.

Video content may be stored as one or more clips, which each provide a group of one or more frames generally relating to a particular scene, shot, or segment. In the past, video editors have often confronted the problem of having to select a particular video clip from multiple video clips displayed as still image thumbnails that are often very similar to one another. Even if the video editor knows which clips are for a particular scene, he or she may be unable to tell from the thumbnail representations which one is which, such as, for example, which is the one where the video recording device panned onto the speaker's face verses the one where the video recording device panned off of the speaker's face versus the one where there was a slow zoom in. The metadata can provide information to associate with such clips to make the video editor's selection easier. The ability to easily find clips using metadata may also facilitate review of clips both during filming and on location.

There are various advantages to returning metadata to a video recording device. For example, the video recording device may create a source file for a video clip and store that source file in a memory card, hard drive, or other storage. If the metadata is returned to the video recording device and associated with the source file there, the storage can be removed without concern about later synchronization with any derived metadata. A unique identifier may be used to tag each piece of media and used to associate metadata that is retrieved from a processing device with the particular piece of media with which it is associated. Associating metadata with video media content at the video recording device may reduce the chance that the metadata is going to, for one reason or another, not end up associated with the video media content.

Certain embodiments do not return metadata to the video recording device. Metadata may be maintained in the computer and, when the file from the video recording device is finally injected into the computer or into the computer network, the metadata may be re-synchronized with the file at the time. For example, a video recording device storing video media content on flash memory or compact flash, such as on a memory card, may send raw media data to a processing device that determines metadata using the data and stores the metadata for later use. The memory card may later be connected to the processing device directly or through a network and the recorded video content and stored metadata can be merged or otherwise associated.

In certain embodiments, a video recording device does not send all of the raw data for a video clip. For example, the video recording device could send just the audio portion of a clip (e.g., in cases where the connection is low bandwidth) for performance of a speech-to-text analysis. This can provide speech-to-text information in a real-time or near real-time for use, for example, on location. In some embodiments, as much of the raw data for a video clip is sent as is appropriate given the connection restraints of the connection device in or attached to the video recording device.

In certain embodiments, a processing device such as a laptop computer is in the same location as the video recording device is filming, but in other embodiments a video recording device may communicate with a network connected device that communicates with a remote computer. The processing unit could be located on a server on the Internet for providing automated analysis of media provided by the video recording device and then either storing that data for synchronization or returning the data to the video recording device. The processing unit may also provide the raw media information (for example, video clips) and data to other computing devices. For example, it may be used to send dailies in real time or near real-time back to studio headquarters so that a producer does not even have to be on location to see the dailies from a B-unit that is out shooting. Note that "dailies," in film making refers to raw, unedited footage shot during the making of a film, which in some cases, at the end of each day is developed and put together in a batch for viewing by the director.

In certain embodiments, a video recording device also leverages a processing device's user interface for parameter adjustments and/or for storage/connectivity for saving/sharing profile and preference data. For example, the computer may be used to control, perhaps remotely, video recording device settings.

Certain embodiments involve a video recording device delaying sending or receiving information rather than sending or returning data in real time or near real time. While a video recording device is recording, it may be desirable to conserve processing power for the recording process, which may involve the video recording device building a file system of video files. The video recording device may wait until it is not recording or is otherwise not busy to send recently recorded files out for processing. In some cases, the video recording device may also wait until it is not recording or is otherwise not busy to receive or process received data. Such techniques of transmitting and performing processing not related to filming in non-recording times may help minimize the burden to the video recording device processor. There can be a significant amount of down time when filming. For example, filming a movie often involves significant downtimes associated with waiting for lighting setup and other things to happen when the video recording device is not doing anything. That time can be spent sending and receiving information.

Illustrative Environment Configuration

Figure 1:
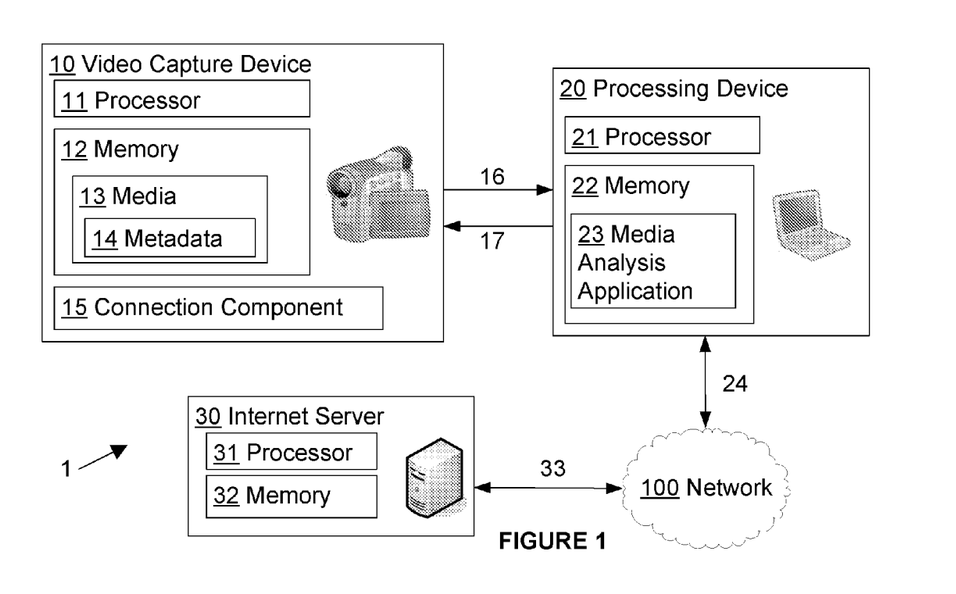
FIG. 1 is a system diagram illustrating an video media creation environment according to certain embodiments.

FIG. 1 is a system diagram illustrating a video media creation environment according to certain embodiments. Other embodiments may be utilized. The system 1 shown in FIG. 1 comprises a video recording device 10 that includes processor 11 and memory 12 for storing captured video media content 13. The video recording device 10 may also comprise a connection component 15 for communicating or otherwise connecting to a processing device 20. The processing device may comprise a computing device such as a laptop computer that comprises a processor 21 and a memory 22. The memory 22 may comprise a media analysis application 23 for receiving and processing communications 16, 17 from and to the video recording device 10. For example, the video recording device may send all or a portion of a piece of video content captured at the video recording device and the media analysis application 23 may analyze the piece of video content to extract and identify data and other information about the piece of media. The video recording device 10 and the processing device 20 may be located at the same location, such as, for example, within the same building, within a video production environment, and/or within range of short range wireless communication technology such as Wi-Fi technology.

The communication 16 from the video recording device 10 to the processing device 20 may comprise raw media content information and other information. Exemplary information includes, but is not limited to, audio track and time codes, clip data (e.g., duration, thumbnail, etc.), video recording device data (e.g., shutter, focus, etc.), and profile data (e.g., gamma, LUT, etc.)

The communication 17 from the processing device 20 back to the video recording device 10 may include information determined or compiled from the information from the video recording device as well as from information from other sources. Examples of such information include, but are not limited to, speech-to-text metadata, scene information, take information, shot name information, information from a script, information about a shot type (e.g., pan, zoom, handheld, etc.), image recognition information (e.g., faces, logos, etc.), GPS location/time data, information obtained through a network 100 (e.g., information from an Internet server 30, satellite view information, weather information, etc.), and edited profile data (gamma, LUT, etc.).

The processing device 20 may send and receive communications 24 to network devices, such as Internet server 30. The connections may be sent through any type of connection including, but not limited to, through a 3G/4G link. An exemplary Internet service device 30 comprises a processor 31 and a memory 32 for providing information or applications.

In one exemplary embodiment, the processing device 20 comprises a portable computing device comprising a computer readable medium on which is encoded program code for receiving video data from a video recording device 10, which may also be a portable video capture device, at substantially the same time as video is being captured. The portable computing device may be communicatively coupled to the portable video capture device in a variety of ways. The compute readable medium may also comprise program code for determining metadata for the video using the video data and program code for transmitting the metadata to the portable video capture device for storage with the video at the portable capture device.

Figure 2:
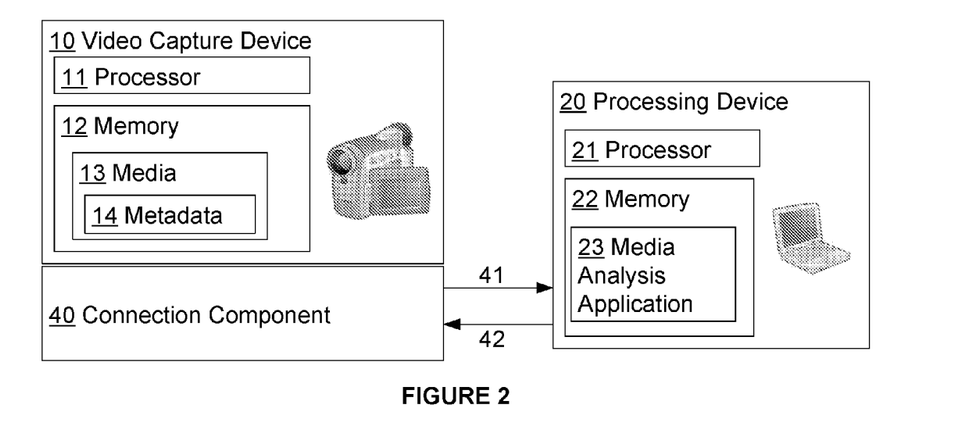
FIG. 2 is a system diagram illustrating an attachable connection component according to certain embodiments.

FIG. 2 is a system diagram illustrating an attachable connection component according to certain embodiments. In this embodiment, the connection component is illustrated as an attachable component capable 40 of attaching to a video recording device. Such an attachable connection component can be used to extend the connection capabilities of an existing video recording device that has no or inadequate connection capabilities. The attachable connection component 40 may be used to connect to a processing device 20 by sending communications 41, 42, or otherwise to connect to any computing or other device with which the video recording device will share information. One exemplary attachable connection component 40 is a wireless networking device add-on for a video recording device. This is merely illustrative. Devices may be communicatively coupled via other mechanisms such as through a USB connection, an Ethernet connection, an infrared connection, and optical connection, a high speed serial bus connection such as one through an IEEE 1394 interface, etc.

Figure 3:
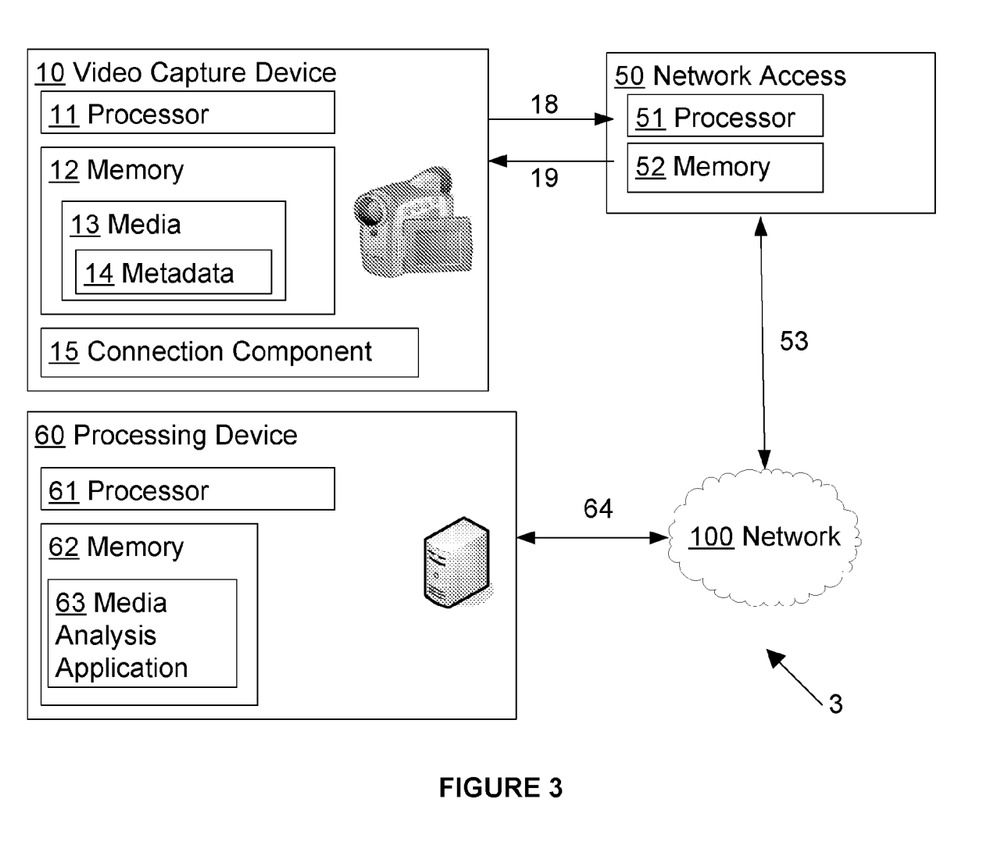
FIG. 3 is a system diagram illustrating another exemplary video media creation environment according to certain embodiments.

FIG. 3 is a system diagram illustrating another exemplary video media creation environment according to certain embodiments. Unlike the system 1 of FIG. 1, the video recording device 10 does not communicate directly with the processing device 20. Instead, the video recording device 20 sends and receives communications 18, 19 to a network access device 50 that then sends and receives communications 53, 64 to and from a processing device 60 through network 100. The network access device 50 may comprise a processor 51 and memory 52 and need not necessarily include a display or other input or output devices. The network access device can essentially act as a "box in the corner" that simply relays communications between the video recording device 10 through the network 100 to the processing device 60 and back. The processing device 60 may comprise a computing device such as a server computer that comprises a processor 61 and a memory 62. The memory 62 may comprise a media analysis application 63 for receiving and processing communications from the video recording device 10 and returning information to the video recording device.

The processing device 60 need not be located at the same location as the video recording device 10 and may also be used to provide information to other parties. For example, video recording device 10 may make the video media content that it receives available to others involved in a video media development project. The processing device 60 may act as a central server providing real-time or near real-time information from a video recording device 10 to others who are not located in the vicinity of the video recording device 10.

The processing device 60 may also store or send for storage information that it extracts from or that is otherwise related to video media content. When the video media content is eventually made available to the processing device or storage unit with the information, the information can be associated with the video media content. For example, raw media content may be sent to the processing device 60 with a unique identifier that can then be associated with any information derived or developed for the raw media content. At a later stage of the development of video media content from the raw media content or at any other time, the information that is derived or developed can be associated with the appropriate video media content using the unique identifier.

Illustrative Method of Determining Metadata for Determining Video Media Content

Figure 4:
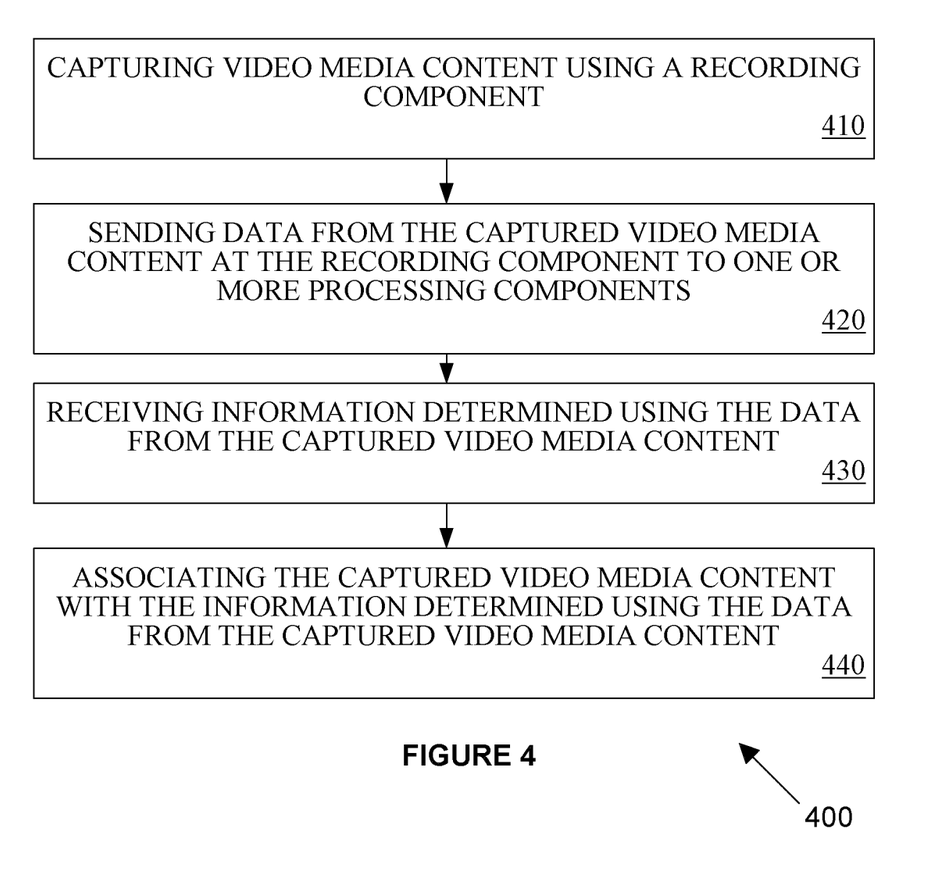
FIG. 4 illustrates an exemplary method for determining video media content according to certain embodiments.

FIG. 4 illustrates an exemplary method for determining video media content according to certain embodiments. The method 400 comprises capturing video media content using a video recording component, as shown in block 410. Such capturing may occur in a variety of ways and involve a variety of devices. In one exemplary embodiment, a video recording device 10 such as the one shown in FIG. 1 is used to capture video media content. Such a device may be a camcorder, a television video camera, a movie video camera, or any other video capturing device.

The method 400 further comprises sending data from the captured video media content at the video recording component to one or more processing components, as shown in block 420. The data from the captured video media content may be less than all of the captured media content. For example, the may include only the audio portion. Alternatively, the data may include all of the captured media content, such as, for example, all of the captured media content stored as an single file at the video recording component. The data from the captured video media content may be sent from a connection component within the video recording device such as the connection component 15 within the video recording device 10 in FIG. 1. Alternatively, the connection component may be externally attached to the video recording component such as the connection component 40 is attached to the video recording device 10 in FIG. 2.

Also, sending data from the captured video media content at the video recording component to one or more processing components as shown in block 420, could occur substantially in real time, such as, for example, as the video is being captured live, data could be transmitted sot that metadata processing could begin at or near real time. There are a variety of uses and potential advantages in cases where metadata is determined at or near real time. In alternative embodiments, sending the data may be delayed, in some cases, providing various alternative advantages and benefits depending on the circumstances.

The method 400 further comprises receiving information determined using the data from the captured video media content, as shown in block 430. The information may include camera metadata such as camera information on iris, focus, zoom, gamma, and white balance. The information may provide GPS coordinates, heading, time, and weather, a scene identifier, a shot identifier, a take number, a scene description, or a character identification, and/or a variety of other pieces of information extracted from, related to, or otherwise determined using the captured video content. The information may have been processed by a separately located processing component such as processing device 20 of FIG. 1 or processing device 60 of FIG. 3.

The method 400 further comprises associating the captured video media content with the information determined using the data from the captured video media content, as shown in block 440. Associating the captured video media content with the information determined using the data from the captured video media content may involve embedding the information as embedded metadata in a file comprising the captured video media content, the file stored at the video recording component.

Figure 5:
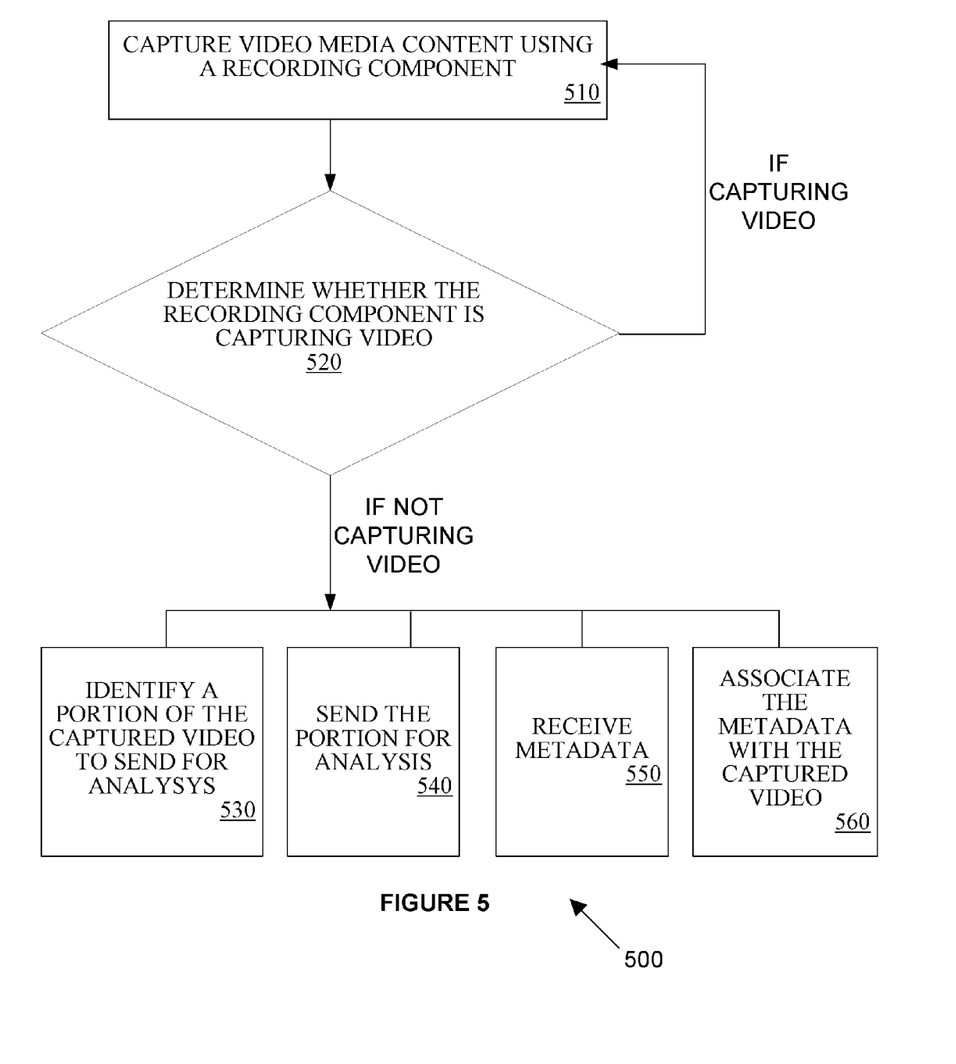
FIG. 5 illustrates an exemplary method of sending data from a recording device for analysis according to certain embodiments.

The sending 420, receiving 430, and associating 440 shown in FIG. 4 may occur while the video recording component is recording. Alternatively, one or more of these block 420, 430, 440 may not occur while the video recording component is recording. For example, FIG. 5 illustrates an exemplary method 500 of sending data from a recording device for analysis according to certain embodiments in which these features are delayed until an appropriate time. This exemplary method 500 captures video content using a recording device as shown in block 510. As described above, there are various techniques and devices that can accomplish this video capture.

The method 500 further comprises monitoring the recording component to determine whether the recording component is capturing video, as shown in block 520. If the video component is capturing video the method continues monitoring as the recording component continues to capture video. Monitoring can be periodic, continuous, or performed at other intervals appropriate for the particular circumstances and components involved. Note that monitoring may also occur while video is being captured to identify if the video capture stops and also while video is not being captured to identify if video capture subsequently begins.

The method 500 further comprises performing one or more functions if it is determined that the recording component is not capturing video. As an example, the method 500 may use the time and free processor capacity available when the recording component is not capturing video to identify a portion of the captured video to send for analysis, as shown in block 530. For example, the method may determine that given the short waiting periods between video capture over the past hour that only the audio portion of a recorded video should be analyzed at the time. The portion may be a time segment of the recorded video, such as the first 10 seconds, a particular attribute of the video, or any other portion of the video. In some cases, the portion will include just the audio or just the visual portion, while in other cases, it will include an entire piece of captured video content.

As another example, the method 500 may use the time and free processor capacity available when the recording component is not capturing video to send the portion for analysis, as shown in block 540, and/or receive metadata, as shown in block 550. These transmissions or other communications may be appropriately reserved for times when the capturing device is not capturing video.

In addition, the method 500 may use the time and free processor capacity available when the recording component is not capturing video to associate any metadata that is received or otherwise known about a captured video with the captured video, as shown in block 560. For example, the processor of a recording component may be used when it is not recording to access stored video content and embed received metadata in the content. As a specific example, the metadata and media content may be associated by sending communications to a repository, database, or other information store associating the video and metadata, e.g., using identifiers that are used with both, e.g., a same identifier that is embedded in a video file containing the captured video and with the metadata received after analysis of the video.

Figure 6:
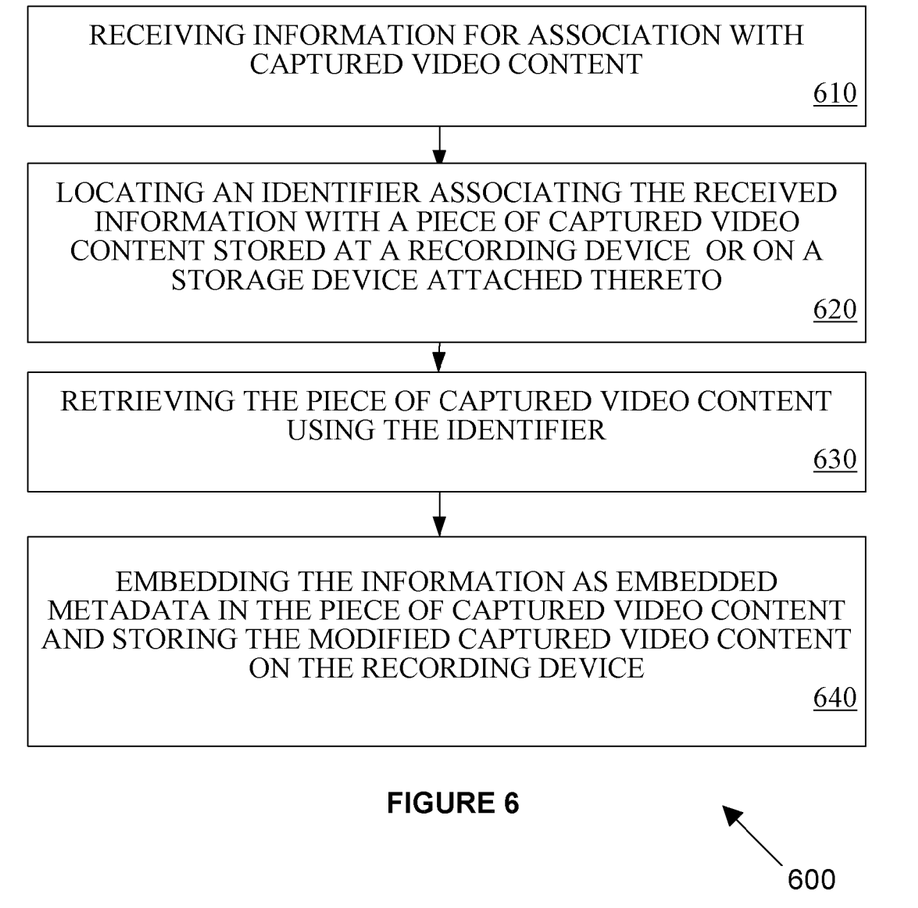
FIG. 6 illustrates an exemplary method of determining and associating metadata with video media content according to certain embodiments.

Alternatively, FIG. 6 illustrates another exemplary method 600 of associating metadata with video content. This exemplary method 600 comprises receiving information for association with captured video media content, as shown in block 610. As described previously, this information may be received in a variety of ways from a variety of sources or may be determined or identified at the recording device itself.

This exemplary method 600 further comprises locating an identifier associating the received information with a piece of captured video content stored at the recording device or on a storage device attached thereto, as shown in block 620. For example, the information may include a unique identifier that uniquely identifies the piece of captured video content. Such an identifier may have been created when the piece of captured video content was recorded and then embedded in or otherwise associated with the stored version of the piece of captured video content.

The exemplary method 600 may further comprise retrieving the piece of captured video content using the identifier, as shown in block 630. For example, if the piece of captured video content is stored on a memory device attached to the recording device, the memory device may be searched for content having the identifier embedded or otherwise stored with the identifier.

The method 600 may further comprise embedding the received information as embedded metadata in the piece of captured video content and storing the modified captured video content, as shown in block 640. For example, such associating could occur within the video recording device as a modification of the media 13 to also include metadata 14, as shown in FIG. 1. Generally, in certain embodiments, associating of the captured video media content with the information by embedding the information as metadata result in a modified version that is made available to the recording device. In some cases, the modified piece of media content is available for use as the recording of additional pieces of captured content continues during a single recording session.

General

Certain embodiments relate to video media content stored on random access files. These are merely illustrative. Certain embodiments may involve capturing video media content for tape storage. Adding metadata to and otherwise using such files may involve spooling through a tape to get a file that is needed and/or re-recording back on tape, e.g., to add metadata. Inserting content into a file that is already on a tape may require two tape heads. Various other variations are also possible In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIGS. 1-3 as functional or storage components on the respective devices. As is known to one of skill in the art, such applications may be resident in any suitable computer-readable medium and execute on any suitable processor. For example, the devices at each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

That which is claimed:

1. A system comprising:
   a connection component at a video recording device, the connection component for receiving captured video media content from the video recording device and sending data from the captured video media content and a unique identifier for the captured video media content to a processing component of another device separate from the video recording device, the unique identifier having been assigned by the video recording device;
   the processing component of the other device for receiving the captured video media content data and using the data from the captured video media content to determine metadata, wherein the metadata comprises one or more attributes extracted or derived from the captured video media content by a procedure performed by the processing component on the data from the captured video media content, wherein the processing component associates the metadata with the unique identifier, and wherein the device includes a return component for sending the metadata and the unique identifier through the connection component for use at the video recording component; and an association component, at the video recording device, for associating the captured video media content with the metadata, wherein the association component embeds the metadata and the unique identifier in a file comprising the captured video media content, the file stored at the video recording device.

2. The system of claim 1, wherein the connection component is a part of the video recording device.

3. The system of claim 1, wherein the connection component is attached to the video recording device, wherein the connection component is removable from the video recording device.

4. The system of claim 1, wherein the connection device transmits the data from the captured video media content from the video recording device to the other device.

5. The system of claim 4, wherein the connection device transmits the data from the captured video media content over a wireless data exchange.

6. The system of claim 1, wherein the association component is separate from the video recording device and receives a file comprising the captured video media content.

7. The system of claim 1, wherein the processing component determines video-related information by retrieving information from an information source available on a network.

8. The system of claim 1, wherein the processing component uses GPS information to provide video-related information to synchronize multiple video recording devices recording a same event.

9. The system of claim 1, wherein the procedure comprises one or more of: speech-to-text conversion, object recognition, face recognition, and scene detection.

10. The method of claim 1, wherein the metadata comprises attributes of a shot, wherein the attributes include one of a close-up, wide shot, pan, zoom, or other type of shot motion.

11. The method of claim 1, wherein the procedure performed by the processing component includes image recognition techniques.

12. A method comprising:
    sending, using a connection component, data from captured video media content and a unique identifier for the captured video media content from a video recording device to a processing component of a device separate from the video recording device, wherein the captured video media content was captured using the video recording device, and wherein the unique identifier was assigned to the captured video media content by the video recording device;
    receiving, at the video recording device, metadata determined using the data from the captured video media content, wherein the metadata comprises one or more attributes extracted or derived by a procedure performed by the processing component on the data from the captured video media content, wherein the processing component associates the metadata with the unique identifier; and
    associating, at the video recording device, the captured video media content with the determined metadata using the data and the unique identifier from the captured video media content.

13. The method of claim 12, wherein associating the captured video media content with the determined metadata from the captured video media content comprises embedding the metadata in a file comprising the captured video media content, the file stored at the video recording device.

14. The method of claim 12, wherein the data from the captured video media content is less than all of the captured media content.

15. The method of claim 12, wherein the data from the captured video media content is only an audio portion of the captured media content.

16. the method of claim 12, wherein the data from the captured video media content is all of the captured media content stored as a single file at the video recording device.

17. the method of claim 12, wherein metadata comprises camera information on one or more of: iris; focus; zoom; gamma; and white balance.

18. the method of claim 12, wherein the metadata comprises information on one or more of: GPS coordinates; heading; time; and weather.

19. the method of claim 12, wherein the metadata comprises a scene identifier, a shot identifier, or a scene description.

20. The method of claim 12, wherein sending data from the captured video media content at the video recording device to one or more processing components comprises delaying sending while the video recording device is recording.

21. The method of claim 12, wherein the sending, receiving, and associating do not occur while the video recording device is recording.

22. A non-transitory computer-readable medium on which is encoded program code, the program code comprising:
    program code for sending, using a connection component, captured video media content data and a unique identifier for the captured video media content from a video recording device to one or more processing components of another device separate from the video recording device, wherein the captured video media content was captured using the video recording device, and wherein the unique identifier is assigned by the video recording device;
    program code for receiving, at the video recording device, metadata determined using the data from the captured video media content data, wherein the metadata comprises one or more attributes extracted or derived from the captured media video content by a procedure performed on the data by the processing component of the other device; and
    program code for associating, at the video recording device, the captured video media content with the determined metadata using the data and the unique identifier from the captured video media content.

23. The computer-readable medium of claim 22, wherein the program code for associating, at the video recording device, the captured video media content with the determined metadata using data from the captured video media content further comprises program code for embedding the metadata in a file comprising the captured video media content, the file stored at the video recording device.

* * * * *